United States Patent Office 3,356,559
Patented Dec. 5, 1967

3,356,559
COLORED FIBER METAL STRUCTURES AND
METHOD OF MAKING THE SAME
Appy Juras, Detroit, Mich., assignor, by mesne assignments, to University Patents, Inc., Chicago, Ill., a not-for-profit corporation of Illinois
No Drawing. Filed July 1, 1963, Ser. No. 292,142
8 Claims. (Cl. 161—5)

ABSTRACT OF THE DISCLOSURE

The invention is directed to composite metal fiber-plastic structures wherein the metal fiber itself is a composite sandwich member having exposed metal on all four edges thereof. Such composite fibers are felted and non-metallurgically bonded after which the interstices may be filled with plastic to form a non-porous structure or the pores may be left unfilled to provide a porous, plastic bonded skeleton. Rigid or flexible sheet materials may be readily made by the patent teachings.

The present invention relates to novel fibrous materials of construction and to the method of their manufacture, and more particularly relates to a fibrous skeletal material fabricated of composite colored metal fibers either taken alone or in combination with various plastic materials.

By the teachings and practices of the present invention I have fabricated a number of colored metal fiber structures and fiber metal plastic composite bodies which are characterized by a strikingly beautiful three-dimensional appearance and by excellent heat resistance, thermal conductivity and physical strength features. Such structures and their modes of fabrication will be hereinafter set forth in greater detail.

Not only does my invention relate to the making of felted colored fiber metal structures per se but it is further directed to the employment of such compacts as the skeletal support for a multitude of thermoplastic and thermosetting resins to form very desirable new materials of construction. Such novel materials have good physical properties and especially good ornamental features.

The fibers preferably employed in the practice of my invention comprise essentially a metal substrate member coated on opposite sides thereof with a color coating member. In the preferred embodiments hereof such coatings are formed of a thin colored epoxy film bonded to the metal. Such fibers are preferably made by cutting metal foils sandwiched between and coated with very thin epoxy resin films.

One embodiment of my invention is directed to a felted, non-metallurgically bonded compact formed of composite coated metal fibers. In another embodiment such compacts are but partially impregnated with a thermoplastic or thermosetting plastic to provide a felted porous structure, whereas in another embodiment the pores of the felt are completely filled with the impregnating plastic. In still another embodiment non-felted, substantially individual composite fibers are employed to reinforce various plastics. In yet another embodiment such fibers are used as a surface treatment for various substrate materials especially transparent substrates. Still another aspect of my invention is directed to the manufacture of colored thread-like materials. All of such embodiments will hereinafter be disclosed in considerable detail to permit those skilled in the art to practice my invention.

A primary object of my invention is to provide both a method of making non-metallurgically bonded composite fiber metal compacts and the compacts resulting therefrom. Another object is to provide solid bodies of such compacts impregnated with various thermoplastic and thermosetting synthetic resins. A further object is to provide a structural member consisting of the composite metal fibers made as herein taught in conjunction with and bonded upon either a flexible or non-flexible backing member. Still another object is to provide a sandwich member consisting essentially of the colored fibers made as herein taught interpositioned and locked between a pair of transparent sheet members. Another object is to form threads from such sheet members.

These and other objects, features and advantages of my invention will become apparent to those skilled in this particular art from the following detailed disclosure thereof.

The prior art most pertinent to the present invention of which I am aware is United States Patent 3,041,131, entitled "Composite Plastic-Metal Fiber Articles and Method for Making Same," which issued in the names of A. Juras et al. on June 26, 1962. Such patent, while directed primarily to the fabrication of articles having abrupt changes of contour generally discloses the reinforcement of various therein specified plastics with short length metal fibers. As will be apparent to those skilled in this art the present specification and claims are directed to an improvement over such referenced patent. From such patent it is readily seen that it is directed to not only the mere reinforcement of plastic structures by bare, simple metal fibers, but furthermore that unlike several embodiments of my invention the fibers are not bonded one to another by means of non-metallic bonding agents. Thus, by the practice of my invention I am able to fabricate more beautiful composites in view of the substantially unlimited coloration available as herein taught and at the same time I am able to provide reinforced plastic structures which have greater strength and thermal conductivity than those somewhat similar compacts which have been disclosed by me and my coinventors in the above-referred to patent.

In addition to such Juras et al. patent which as noted above is directed to completely unbonded fibers, at the other extreme, when one considers fiber bonding are those disclosures which are concerned with sinter-bonded or in other manners metallurgically bonded fiber compacts, which are subsequently impregnated with plastic materials. Here there are two references of interest, references which at the present writing are involved in an interference proceeding before the Patent Office. One is an application of C. H. Sump et al., Ser. No. 31,911, entitled "Metal-Plastic Combinations and Methods of Making Same," which is owned by the assignee of the present application and the other is the patent of Mazzucchelli et al., U.S. 2,967,756, entitled "Composite Plastic-Fibrous Metal Mat Tool." Such two disclosures are related to metallurgically bonded fiber metal compacts which are subsequently impregnated with various thermosetting and thermoplastic synthetic resins. Of necessity such compacts must involve at least two processing steps subsequent to the fabrication or felting of the unsintered fiber mat. First the fibers must be metallurgically joined. This must be accomplished in the absence of the plastic because the latter would be destroyed at the temperature necessary to produce metal-to-metal bonds. Then the plastic is impregnated into the porous interstices formed within the felted compact.

In distinction to the teachings of the prior art I have developed a colored composite fiber metal compact, in one embodiment hereof in which the fibers are non-metallurgically bonded to each other. Other embodiments of my invention are directed to the reinforcement and alteration of plastic materials either by the deposition of the present colored fibers with a plastic matrix or upon the surface of a plastic sheet or flexible film.

The fibers employed in the various embodiments of the present invention are in and of themselves composite structures. In the preferred embodiment of my invention such fibers are of substantially rectangular cross section and the substrate metal structure is sandwiched between and adherent with opposed colored epoxy coating members. Such fibers, which may be non-metallurgically bonded per se or otherwise used as herein taught, are preferably fabricated by being sawed or otherwise cut from foil starting materials. The preferred foils, at least insofar as the work that I have performed is concerned, are sold by the Revere Copper and Aluminum Company. These foils consist of a thin aluminum sheet 0.0003 inch thick, having coated upon opposed faces thereof colored epoxy resin 0.0002 inch thick. The sandwich-type structure therefore has a total thickness of 0.0007 inch. To prepare the fibers such foils are preferably stacked in laminates approximately one inch high for passage across the face of a rotating saw for reduction to the desired fiber size. The fibers may also be chopped or broached from the laminate stack.

It should be noted that epoxy resins which are the preferred coating material to use on the metal foil are presently commercially available in literally thousands of shades of colors and thus by the practice of my invention such variety in fiber coloration is likewise available. Thus, the combination of colors which may be used in this invention is practically infinite.

Sheet material of epoxy coated aluminum foils, as noted above, are commercially available. The foils are first stacked into laminates and then cut to the desired size for subsequent fiberization preferably by sawing. Laminate strips are sawed.

By the term "fiber" as employed in the present specification and claims is meant a relatively short length elongated structure which has a length to mean dimension in cross section ratio of greater than 10 to 1. The term "mean dimension in cross section" is related to the shape of the fiber in cross section and refers to the diameter of the cross section in the case such is circular, or in the preferred embodiment hereof wherein said fiber is substantially rectangular, denotes one-half the sum of the short side and the long side of the rectangle. Generally speaking, the fibers that are most useful in the practice of my invention insofar as their length is concerned fall intermediate the metal powders on the one hand and the relatively long length metal filaments which are employed in the metallic wool arts. The critical aspect of fiber length and also to a somewhat lesser extent mean dimension in cross section is that the fibers be of such size as to be feltable into a substantially uniform three dimension porous mass.

This uniform feltability feature along with relatively porous resulting structures are the chief distinguishing features of fiber metal compacts over both the metal powders and the metal wools. Fairly uniform bodies have been fabricated from metal powders but of necessity these must be quite dense—at a minimum 48% dense—in order to have individual powder grains in contact with and bondable to adjoining granular members. The long length filaments of the metal wools, on the other hand, are not feltable into a uniform body. A large degree of porosity is possible but the filaments comprising metal wools, while overlapping and enmeshed, are still substantially oriented in the direction of filament length. Additionally, the wools, because of bridging effects and the like, are not uniformly porous.

Thus feltability is the critical aspect when one considers the size of the fibers for use in the practice of my invention. Particularly good results in fabricating the hereinafter described and claimed structures have been achieved with fibers 1/8 to 3/16 inch long and a mean dimension in cross section of 0.0007 inch. Fiber lengths and cross sectional dimensions for these materials which have utility with my invention range from 0.001 to 2 inches and from 0.0001 to 0.1 inch respectively.

It is preferred that the color coating on the individual fibers be either transparent or translucent in order to bring out the striking beauty of the metal core. However, if desired opaque coatings thereon may be employed.

The plastic material which may be employed in conjunction with the colored fiber metal compacts generally may either be of the thermoplastic or thermosetting variety although it is preferred that they be of a thermosetting nature. Furthermore, in order to more fully exhibit the inherent stereoscopic beauty of the colored fiber compacts, I prefer to employ colorless plastics as the void filling agent or backing member, although it will be understood that at the option of the user colored plastics may also be so employed. While substantially all plastics may be used the following may be named for purposes of example.

*Thermosetitng:* Epoxy resins, polyesters, phenol-formaldehyde resins, urea formaldehyde resins, melamine and furane-furfural resins.

*Thermoplastic:* Polystyrene, vinyl resins, polyurethane, nylon, Mylar, polythenes, e.g. polyethylene and polypropylene, and butyrate resins.

My invention may be further understood by reference to the accompanying examples which are submitted for the purposes of illustration:

EXAMPLE I

*Preparation of composite fibers*

Sheets of blue colored epoxy resin coated aluminum foil were stacked into one-inch high laminates. Each foil consisted of an aluminum base member 0.0003 inch thick coated on both faces by epoxy resin 0.0002 inch thick. This foil was purchased. The laminates were held together in a jig and reduced to fibers 3/8 inch long by 0.0007 inch thick by a circular saw at right angles to their major dimension by repeatedly being passed against the saw blade. As the cutting took place the laminate separated and the individual fibers could then be collected in a bin beneath the saw. In the following examples these fibers and fibers of other colors were employed.

EXAMPLE II

*Formation of a non-metallurgically bonded fiber metal compact*

The composite fibers were sifted to remove relatively finer material after which they were felted into a three dimensional compact in a molding form. By the interlacing of the fibers a modest degree of green strength is achieved but one must exercise due caution in handling the compacts. It is preferred that the fibers be moderately kinked or curled, a somewhat natural result of sawing, in order that the contact between individual fibers be better secured and thus the green strength of the compact improved. Such fibers normally have a very minute amount of oil on their surfaces which causes some degree of adherence in their non-bonded state. The oil results from the machining into fibers. If such oil is not present almost any non-reactive wetting agent such as glycerine can be employed to assist in the green state inter-fiber adherence. The fibers may be felted through air into the mold form or from a slurry, as for example from a glycerine or water carrier member.

The fibers of the green felted compacts are then non-metallurgically bonded. This can be most readily accomplished by pouring small amounts of uncured liquid resin into the compact whereby capillary attraction will retain the liquid on the fibers followed by curing of the resin to set it and thus bond the fibers one to another at their respective points of contact.

EXAMPLE III

*Formation of a non-metallurgically bonded fiber metal compact*

The composite color coated fibers were fabricated as taught above. A mixture of such fibers and liquid uncured epoxy resin was gunned into a forming mold to felt and interlock the fibers. The resin was then cured to provide a non-metallurgically bonded compact.

EXAMPLE IV

*Plastic impregnation*

The bonded compact was fabricated as discussed above. B stage epoxy resin, that is uncured, was vacuum impregnated into the compact. The resin was then cured.

With thermoplastic, the resin is first melted and then either poured into or vacuum impregnated into the compact. Mere cooling permits the resin to set.

EXAMPLE V

*Plastic reinforcement*

The colored fibers in this case are not bonded at all but are merely randomly distributed throughout the plastic mass. A loose mass of fibers are impregnated with for example uncured epoxy and the resin is then cured to harden.

EXAMPLE VI

*Sheet materials*

The fibers are flocked onto a multitude of substrate members including for example "Lucite" sheets or plywood. To accomplish this practically any adhesive may be spread on the surface to be coated after which the fibers are sprayed thereon. In addition, if a plastic substrate is used chemicals such as acetone or methyl ethyl ketone may be employed to assist in bonding the composite fibers to the substrate. In this latter instance the substrate is very minutely and temporarily dissolved to form a locus for fiber attachment.

EXAMPLE VII

*Colored flexible sheets*

In this instance the fibers are deposited on a sheet substrate of for example clear, tacky, pressure sensitive cellophane. I have employed "Scotch Tape" sheet materials for this purpose. The amount of fibers that can be deposited in this manner is substantially controlled by the area of mastic surface available for the fibers to adhere to. Thus very thin, attractive coatings can be so made.

EXAMPLES VIII

*Sandwich structures*

The fibers are first deposited as illustrated in Example VII. Upon the fiber face is then superimposed another sheet of tacky cellophane, tacky side facing the fibers. A very attractive sheet material results.

EXAMPLE IX

*Multicolored threads*

The sandwich structures resulting from Example VIII are slit into threads. Such threads may be woven into fabrics or used as components thereof.

While the foregoing disclosure is directed primarily to the use of metal fibers which result from the sawing of foils and thus have a somewhat rectangular cross section, it will be readily understood and appreciated that fibers of other cross sectional shapes, primarily circular, may be similarly employed. For example, aluminum or copper wires may be color coated with epoxy resins in the same manner as are the foils and such wires may then be chopped into fibers for use as herein taught.

It will also be understood that while the coloring member previously discussed consists of epoxy resins, other coloring materials which are adherent to thin metal structures may be similarly used.

It will be understood that various modifications and variations may be effected without departing from the spirit or scope of the novel concepts of my invention.

I claim as my invention:

1. A non-porous composite metal fiber-plastic structure comprising:
   a felted mass of metal fibers, each of said fibers being in itself a composite structure consisting of an inner metal layer sandwiched between relatively thinner colored plastic coatings on each of the two opposed principal surfaces of said metal layer, each of said fibers being further characterized by
      (a) having essentially a rectangular shape;
      (b) an exposed metal layer edge on all four side edges thereof;
      (c) a length of between 0.001 and 2 inches;
      (d) a length to mean dimension in cross section ratio greater than ten to one,
   said felted mass of fibers having the interstices thereof filled with a plastic material.

2. A porous composite metal fiber-plastic structure comprising:
   a felted mass of metal fibers, each of said fibers being in itself a composite structure consisting of an inner metal layer sandwiched between relatively thinner colored plastic coatings on each of the two opposed principal surfaces of said metal layer, each of said fibers being further characterized by
      (a) having essentially a rectangular shape;
      (b) an exposed metal layer edge on all four side edges thereof;
      (c) a length of between 0.001 and 2 inches;
      (d) a length to mean dimension in cross section ratio greater than ten to one,
   said felted mass of fibers being bonded together at points of fiber contact by means of a plastic material.

3. The non porous composite metal fiber-plastic structure as defined in claim 1, wherein said metal fibers are of metal selected from the group consisting of copper, iron, steel, stainless steel and aluminum and the color coating thereon is made of colored epoxy resin.

4. The porous composite metal fiber-plastic structure as defined in claim 2, wherein said metal fibers are of metal selected from the group consisting of copper, iron, steel, stainless steel and aluminum and the color coating thereon is made of colored epoxy resin.

5. A solid, non porous metal fiber reinforced plastic structure comprising in combination:
   a plastic matrix enmeshing a plurality of individual, discrete metal fibers, each of said fibers being in itself a composite structure consisting of an inner metal layer sandwiched between relatively thinner colored plastic coatings on each of the two opposed principal surfaces of said metal layer, each of said fibers being further characterized by
      (a) having essentially a rectangular shape;
      (b) an exposed metal layer edge on all four side edges thereof;
      (c) a length of between 0.001 and 2 inches; and
      (d) a length to mean dimension in cross section ratio greater than ten to one.

6. A composite structure comprising in combination:
   a substrate sheet member having a fibrous coating layer adherent thereon, said coating member consisting essentially of a felted mass of metal fibers, each of said fibers being in itself a composite structure consisting of an inner metal layer sandwiched between relatively thinner colored plastic coatings on each of the two opposed principal surfaces of said metal layer, each of said fibers being further characterized by
      (a) having essentially a rectangular shape;
      (b) an exposed metal layer edge on all four side edges thereof;
      (c) a length of between 0.001 and 2 inches; and
      (d) a length to mean dimension in cross section ratio greater than ten to one.

7. The composite structure as defined in claim 6 wherein said substrate member is flexible.

8. A composite structure comprising in combination: a felted mass of metal fibers sandwiched between a pair of transparent sheet members, each of said fibers being in itself a composite structure consisting of an inner metal layer sandwiched between relatively thinner colored plastic coatings on each of the two opposed principal surfaces of said metal layer, each of said fibers being further characterized by
   (a) having essentially a rectangular shape;
   (b) an exposed metal layer edge on all four side edges thereof;
   (c) a length of between 0.001 and 2 inches;
   (d) a length to mean dimension in cross section ratio greater than ten to one,
said felted mass of metal fibers being bonded at points of fiber contact by a plastic means.

References Cited

UNITED STATES PATENTS

| | | | |
|---|---|---|---|
| 2,081,538 | 5/1937 | Hoarle | 161—5 |
| 2,129,504 | 9/1938 | Prindle | 161—220 |
| 2,714,569 | 8/1955 | Prindle et al. | 161—175 |
| 2,901,455 | 8/1959 | Juras | 260—40 |
| 3,041,131 | 6/1962 | Juras et al. | 161—170 |
| 3,053,713 | 6/1962 | Juras | 161—186 |
| 3,184,368 | 5/1965 | Juras | 161—157 |

OTHER REFERENCES 889,583   2/1962   Great Britain.

MORRIS SUSSMAN, *Primary Examiner.*

EARL M. BERGERT, *Examiner.*